May 5, 1925.

D. JORDAN

TRACTOR HITCH

Filed May 15, 1924

1,536,103

Inventor

D. Jordan

By C A Snow & Co.
Attorneys.

Patented May 5, 1925.

1,536,103

UNITED STATES PATENT OFFICE.

DANIEL JORDAN, OF HARRISON, NEBRASKA.

TRACTOR HITCH.

Application filed May 15, 1924. Serial No. 713,556.

*To all whom it may concern:*

Be it known that I, DANIEL JORDAN, a citizen of the United States, residing at Harrison, in the county of Sioux and State of Nebraska, have invented a new and useful Tractor Hitch, of which the following is a specification.

This invention relates to a tractor hitch, the primary object of the invention being to provide a tractor hitch including a draw bar which is exceptionally long to increase the adjustment qualities of the draw bar so that the hitch associated with the draw bar may be positioned to permit the machine or implement drawn by the tractor to operate at various angles.

Another important object of the invention is to provide means for bracing and securing the outer ends of the draw bar to insure against the draw bar bending while in use.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figures 1, 2:
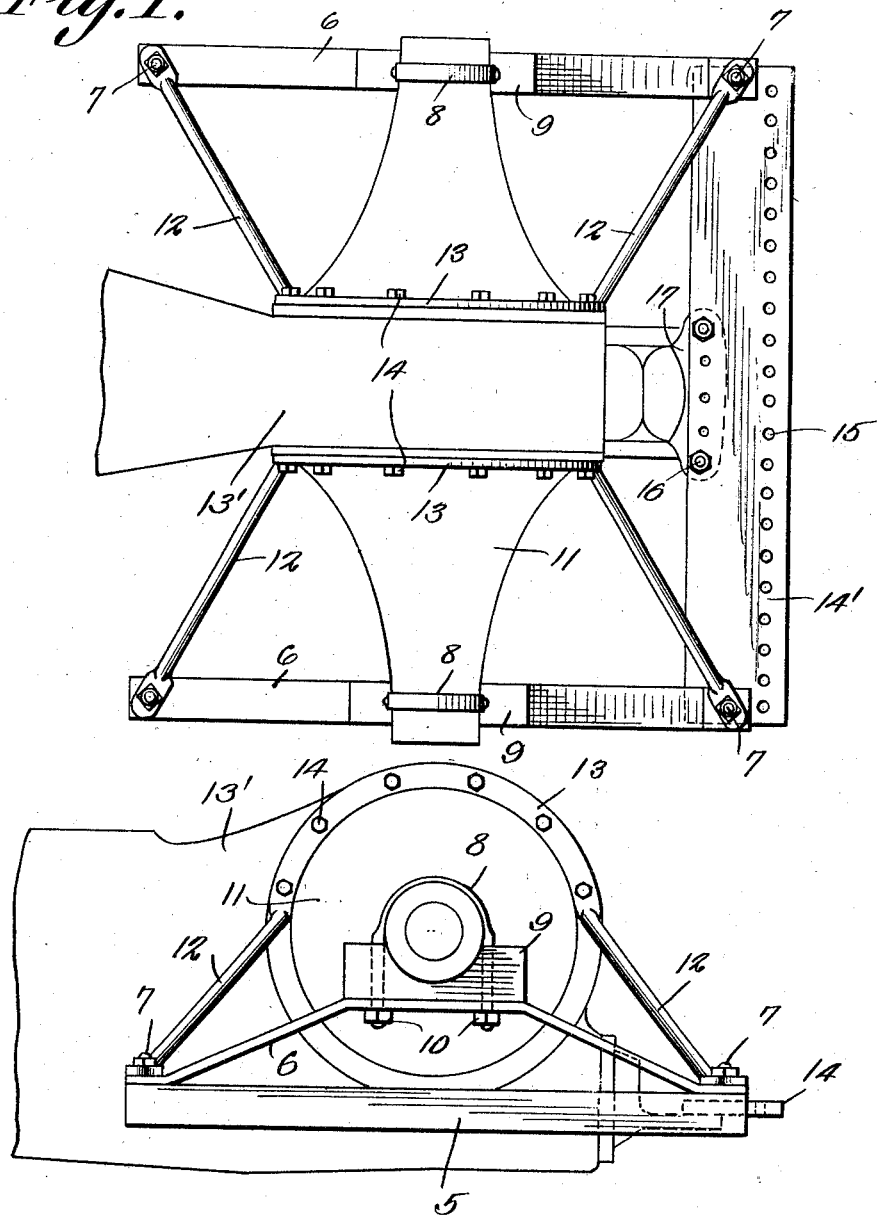
Figure 1 is a plan view disclosing a tractor hitch constructed in accordance with the present invention as applied.
Figure 2 is an end elevational view thereof.

Referring to the drawing in detail, the tractor hitch comprises a frame including side members 5 formed preferably of angle iron. Extending upwardly from the side members 5 are supporting members 6 which are formed preferably of spring steel, the ends thereof being bolted to the side members 5 at 7.

The supporting members 6 are formed with openings to accommodate the ends of the inverted U-bolts 8 that also extend through bearing blocks 9 that rest on the supporting members 6 to secure the bearing blocks against movement. Nuts 10 are provided on the ends of the inverted U-bolts 8 to hold the U-bolts in position.

As shown, the inverted U-bolts 8 embrace portions of the rear axle housing 11 securing the rear axle housing to the bearing blocks. The supporting arms 12 are formed integral with the curved sections 13 that are provided with openings to receive the bolts 14 employed for securing the sections of the rear axle housing to the differential housing 13 so that the arms will be rigidly held with respect to the tractor.

The reference character 14 indicates the draw bar which as shown, is relatively long and provided with openings to receive the bolts 7 at the rear of the tractor for securing the draw bar to the arms. Formed throughout the length of the draw bar 14 and arranged in spaced relation are openings 15, which openings are adapted to receive a suitable hook or the like carried at one end of a chain or bar for hitching a machine or implement to the tractor.

In order that the central portion of the draw bar 14 will be held rigid, suitable openings are provided at points intermediate the ends thereof, which openings accommodate bolts 16 that extend through the usual draw bar 17 of a tractor.

From the foregoing it will be obvious that due to this construction, a machine or implement may be connected to the tractor throughout the length of the draw bar 14 adapting the tractor for various usages.

I claim:—

In a tractor hitch, a frame including side members, supporting arms having their free ends connected to the frame, a curved section for connecting the arms, said curved section adapted to be secured adjacent to the differential housing, and a bar connected with the side members of the frame and having a plurality of spaced openings formed therein.

In testimony that I claim the foregoing as my own, I have hereto affixed my signature in the presence of two witnesses.

DANIEL JORDAN.

Witnesses:
J. H. WILHERMSDORF,
A. C. DAVIS.